(12) United States Patent
Liardet

(10) Patent No.: US 6,609,142 B1
(45) Date of Patent: Aug. 19, 2003

(54) METHOD OF PERFORMING MULTIPLICATION WITH ACCUMULATION IN A GALOIS BODY

(75) Inventor: Pierre-Yvan Liardet, Peynier (FR)

(73) Assignee: STMIcroelectronics S.A., Gentilly (FR)

( * ) Notice: Subject to any disclaimer, the term of this patent is extended or adjusted under 35 U.S.C. 154(b) by 395 days.

(21) Appl. No.: 09/621,891

(22) Filed: Jul. 20, 2000

(30) Foreign Application Priority Data

Jul. 20, 1999 (FR) .............................. 99 09395

(51) Int. Cl.$^7$ .............................. G06F 7/72; G06F 7/52
(52) U.S. Cl. ........................................ 708/492; 708/523
(58) Field of Search .................... 708/492, 501, 708/523

(56) References Cited

U.S. PATENT DOCUMENTS

| | | | | |
|---|---|---|---|---|
| 5,623,683 A | * | 4/1997 | Pandya ........................ | 708/625 |
| 5,862,067 A | * | 1/1999 | Mennemeier et al. ....... | 708/501 |
| 6,078,939 A | * | 6/2000 | Story et al. ................. | 708/501 |
| 6,182,104 B1 | * | 1/2001 | Foster et al. ................ | 708/501 |
| 6,463,451 B2 | * | 10/2002 | Lim et al. ................... | 708/523 |
| 2001/0032228 A1 | * | 10/2001 | Fischer et al. .............. | 708/622 |

* cited by examiner

Primary Examiner—David H. Malzahn
(74) Attorney, Agent, or Firm—Lisa K. Jorgenson; Stephen Bongini; Fleit, Kain, Gibbons, Gutman & Bongini P.L.

(57) ABSTRACT

A method is provided for performing multiplication with accumulation in a Galois Field on a first data, a second data, and a third data, with each of the data being coded on 2 n bits. A first multiplication, in the sense of the arithmetic of a Galois Field, is performed on the first data and the n lowest weight bits of the second data to produce a first intermediate result coded on 3 n bits, and a first addition, in the sense of the arithmetic of a Galois Field, is performed on the third data and the first intermediate result to produce a second intermediate result on 3 n bits. A second multiplication, in the sense of the arithmetic of a Galois Field, is performed on the first data and the n highest weight bits of the second data to produce a third intermediate result on 3 n bits, and a second addition, in the sense of the arithmetic of a Galois Field, is performed on the 2 n highest weight bits of the second intermediate result and the third intermediate result to produce a fourth intermediate result coded on 3 n bits. In a preferred embodiment, the 2 n highest weight bits of the second intermediate result are stored in an intermediate register and the n lowest weight bits of the second intermediate result in an output register.

14 Claims, 2 Drawing Sheets

METHOD OF PERFORMING MULTIPLICATION WITH ACCUMULATION IN A GALOIS BODY

CROSS-REFERENCE TO RELATED APPLICATIONS

This application is based upon and claims priority from prior French Patent Application No. 99-09395, filed Jul. 20, 1999, the entire disclosure of which is herein incorporated by reference.

BACKGROUND OF THE INVENTION

1. Field of the Invention

The present invention relates to electronic circuits, and more specifically to a circuit and method for performing multiplication with accumulation in a Galois Field.

2. Description of Related Art $GF(2^k)$ is the field of polynomials of degree k−1 at the most with coefficients over {0,1}. Galois Fields are examples of finite element sets on which mathematical operations are defined differently. The Galois Field $GF(2^k)$ is a field which comprises k elements, with $k=2^k$. A representation of this field is the polynomial representation. All the elements can be expressed in the form of a polynomial of degree k−1: $P(x)=a_{k-1}x^{k-1}+a_{k-2}x^{k-2}+ \ldots a_2x^2+a_1x+a_0$, with $a_i$ being a coefficient belonging to GF(2), and thus equal to either "0" or "1". Consequently, each element can be assimilated to a number coded on k bits. This causes the calculations performed on the different elements to correspond to calculations performed on polynomials reduced using an irreducible polynomial of degree k.

Galois Fields can be used in digital transmissions to produce error correction codes or as mathematical structures serving as a support for implementing cryptographic systems. An example of encryption codes is the elliptic curve encryption. This type of encryption uses binary numbers coded on a large number of bits (typically 150 to 200 bits). The calculation devices used at present are classical processors, and in some cases are coupled to dedicated circuits. If a conventional processor is used, the calculation time is difficult to optimize. On the other hand, the use of dedicated circuits is more cumbersome and consumes more energy.

With Galois Fields, the calculations performed on numbers coded on k bits representing the elements of the field are carried out differently from usual addition and multiplication operations. Thus, the addition of two elements is carried out bit by bit using an exclusive OR logic circuit. A subtraction is carried in an identical manner as for an addition. A multiplication is performed in two stages: in a first stage a multiplication similar to the multiplication of two polynomials is performed, then in a second stage a reduction using an irreducible polynomial of degree k is performed.

Another operation frequently used in a Galois Field is a "multiplication with accumulation", which is denoted as Xmac. This operation, which calls for three items of data A, B and C, is defined as follows: Xmac(A,B,C)=A×B+C, where the symbol "×" denotes multiplication in the sense of the arithmetic of polynomials with coefficients on GF(2), and where the symbol "+" denotes addition in the sense of the arithmetic of a Galois Field.

Conventionally, the data A, B and C are coded on a same number of bits. Thus, if A and B are coded on n bits, an electronic circuit for carrying out the multiplication in the sense of the arithmetic of a Galois Field would comprise n accumulation latches, n adders, and so on. Accordingly, the size of circuits suitable for carrying out operations in a Galois Field depends directly on the size (i.e., the number of bits) of the numbers that involved in the different operations.

FIG. 1 is a block diagram showing a conventional circuit for performing multiplication operation with accumulation in a Galois Field. As mentioned above, three items of data A, B and C are used in a multiplication operation with accumulation. The first data A is stored in a first input register Areg, the second data B is stored in a second input register Breg, and the third data C is stored in a third input register Creg. The data A, B, and C have a size of 2 n bits. The first, second, and third input registers Areg, Breg, and Creg are preferably registers capable of containing 2 n bits. They can, however, have a different size, provided their size is sufficient to contain the data A, B, and C. The different registers can belong to a common memory unit or to separate memory units.

A circuit 10 for multiplication in a Galois Field receives the data A and B, which are respectively conveyed by a first data bus 12 and by a second data bus 14 from the input registers Areg and Breg. The circuit 10 for multiplication in a Galois Field performs a multiplication, in accordance with the arithmetic of a Galois Field, of the first data A and the second data B. The result of this multiplication, which is output by the multiplication circuit 10, is a number coded on 4 n bits. This result is sent to a logic circuit 18 by a third data bus 16. The logic circuit 18 carries out the addition, in accordance with the arithmetic of a Galois Field, of the result of the multiplication in the Galois Field and the third data C stored in third register Creg. In particular, the third data bus 20 sends the 2 n bits coding the number C to the logic circuit 18. Generally, the logic circuit 18 is a two input exclusive OR (ex-OR) gate.

The result of the addition, in the sense of the arithmetic of a Galois Field, performed by the logic circuit 18 is a number coded on 4 n bits. The 2 n lowest weight bits (i.e., least significant bits) of the result of the addition operation are stored in a first output register LSW (less significant word) and the 2 n highest weight bits (i.e., most significant bits) of the result of the operation are stored in a second output register MSW (most significant word).

As mentioned above, the size of the circuit 10 for multiplication in a Galois Field depends directly on the size of the numbers which must be multiplied. It is common, for example in encryption operations of the elliptical curve type, to have to perform multiplications of numbers coded on 32 bits. The size of the multiplication circuit 10 is then quite considerable and it becomes too costly to implement because of the size of the required multiplication circuit.

SUMMARY OF THE INVENTION

In view of these drawbacks, it is an object of the present invention to overcome the above-mentioned drawbacks and to provide a method for performing multiplication with accumulation in a Galois Field using a multiplication circuit that is not extremely large, and therefore not overly costly. A specific chain of successive operations is performed which makes it possible to replace multiplication between two numbers of 2 n bits by two multiplications between one number of 2 n bits and one number of n bits. Thus, The multiplication circuit required to implement the operation (i.e., which must perform multiplications between a number of 2 n bits and a number of n bits) is reduced in size by approximately two. More specifically, in the circuit for performing such a multiplication, the 2 n accumulation latches, 2 n adders, and so on are replaced by n accumulation latches and n adders.

One embodiment of the present invention provides a method is provided for performing multiplication with accumulation in a Galois Field on a first data, a second data, and a third data, with each of the data being coded on 2 n bits. According to the method, a first multiplication, in the sense of the arithmetic of a Galois Field, is performed on the first data and the n lowest weight bits of the second data to produce a first intermediate result coded on 3 n bits, and a first addition, in the sense of the arithmetic of a Galois Field, is performed on the third data and the first intermediate result to produce a second intermediate result on 3 n bits. A second multiplication, in the sense of the arithmetic of a Galois Field, is performed on the first data and the n highest weight bits of the second data to produce a third intermediate result on 3 n bits, and a second addition, in the sense of the arithmetic of Galois Field, is performed on the 2 n highest weight bits of the second intermediate result and the third intermediate result to produce a fourth intermediate result coded on 3 n bits. In a preferred embodiment, the 2 n highest weight bits of the second intermediate result are stored in an intermediate register and the n lowest weight bits of the second intermediate result in an output register, and the n lowest weight bits stored in the output register are shifted to the lowest weight bits of the output register.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Figure 1:
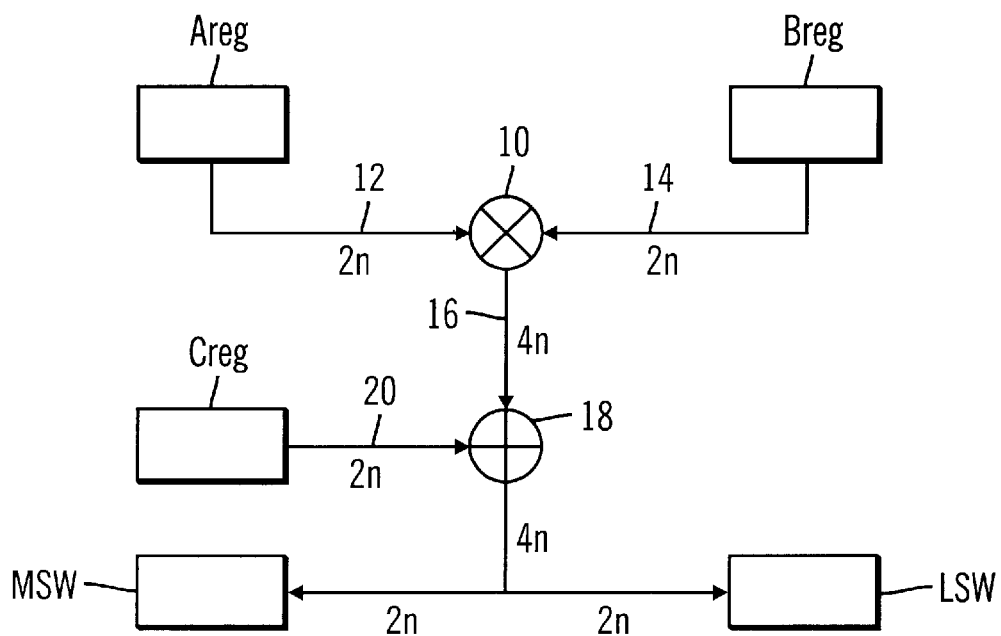
FIG. 1 is a block diagram showing a conventional circuit for performing multiplication with accumulation in a Galois Field.
Figure 2:
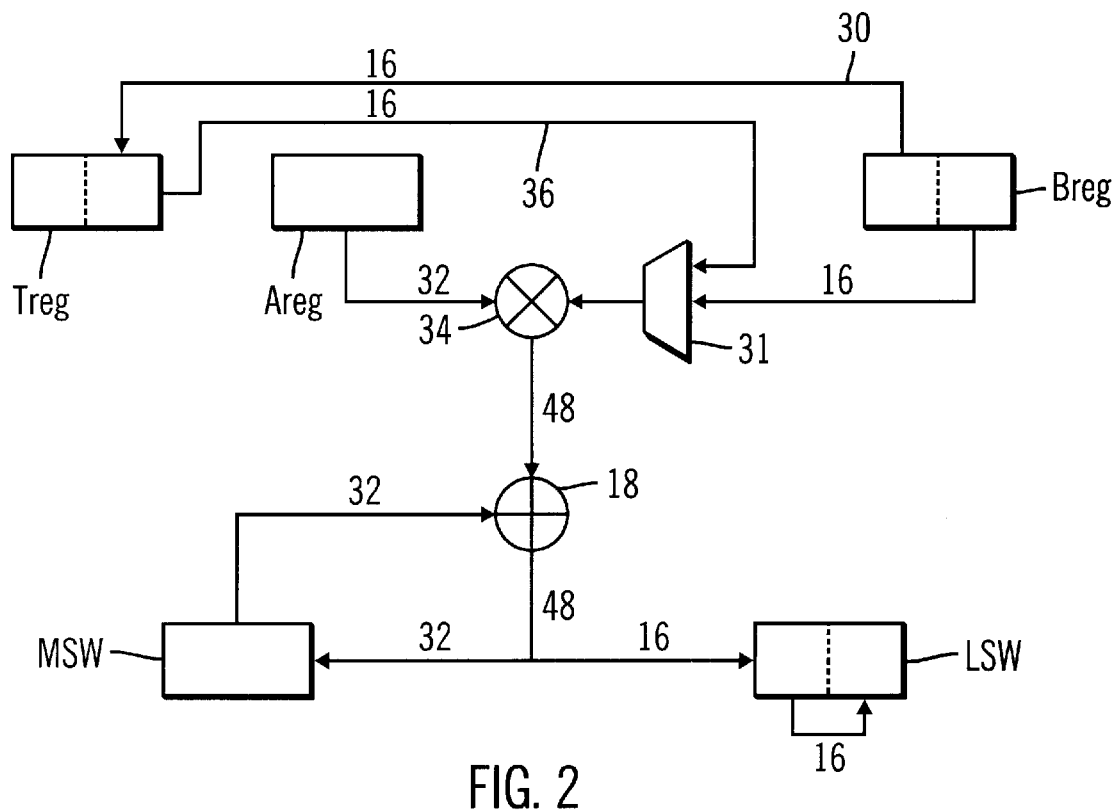
FIG. 2 is a block diagram showing a circuit for performing multiplication with accumulation in a Galois Field according to a preferred embodiment of the present invention.

Preferred embodiments of the present invention will be described in detail hereinbelow with reference to the attached drawings. The method of the present invention will described in the context of a multiplication with accumulation operation on numbers coded on 32 bits (i.e., a case in which n=16). However, this is purely by way of illustration and is not meant to limit the scope of the present invention. Furthermore, some elements of FIG. 2 are analogous to elements described above with respect to FIG. 1. These common elements are designated by the same reference labels.

A circuit for performing multiplication with accumulation in a Galois Field according to a preferred embodiment of the present invention is shown in FIG. 2. As shown, a first input register Areg and a second input register Breg respectively receive a first data A and a second data B coded on 32 bits.

A data bus 30 connects the second register Breg to a target register Treg. The data bus 30 serves to transfer the bits from the second register Breg to the target register Treg. A multiplexer 31 receives bits from the target register Treg at one input and data from the second input register Breg at another input.

The output of the multiplexer 31 is connected to a multiplier circuit 34 which performs multiplications in the sense of the arithmetic of a Galois Field. The multiplier circuit 34 has a second input that receives the data from the first input register Areg. A logic circuit 18 has a first input which receives the data from the multiplier circuit 34 and a second input which receives data from an intermediate register MSW. The data from the logic circuit 18 are distributed among register MSW and an output register LSW.

In the preferred embodiment, the method of the present invention is implemented as follows. The three data A, B, and C are stored in the first input register Areg, the second input register Breg, and the intermediate register MSW, respectively. First, the 32 bits of the first data A are multiplied within the multiplier circuit 34 by the 16 lowest weight bits of the second data B. At the same time, the 16 highest weight bits of the second data are transferred via the data bus 30 to the lowest weight bits of the target register Treg. The result of the multiplication performed between the 32 bits of the first data A and the 16 lowest weight bits of the second data B produces a first intermediate result coded on 48 bits.

Next, the logic circuit 18 performs an addition, in the sense of the Galois arithmetic, of the first intermediate result and the third data C stored in the intermediate register MSW. Thus, there is obtained a second intermediate result coded on 48 bits at the output of the logic circuit 18. The 32 highest weight bits of the second intermediate result are stored in the intermediate result register MSW, while the 16 lowest weight bits of the second intermediate result are stored in the output register LSW. In a convention manner for writing into registers, the 16 lowest weight bits of the second intermediate result are automatically stored in the 16 highest weight bits of the output register LSW.

Then, the 16 lowest weight bits of the second intermediate result are shifted towards the lowest weight bits of the output register LSW. The 32 bits of the first data A are then multiplied by the 16 highest weight bits of the second data B within the multiplier circuit 34. A third intermediate result coded on 48 bits is thus produced at the output of the multiplier circuit 34. Then, the third intermediate result is added within the logic circuit 18 to the contents of intermediate register MSW coded on 32 bits. Thus, there is produced a fourth intermediate result coded on 48 bits at the output of the logic circuit 18.

Next, the 32 highest weight bits of this fourth intermediate result are stored in the intermediate register MSW and the 16 lowest weight bits of the fourth intermediate result are stored in the highest weight bits of register LSW. The result of the operation Xmac (A, B. C)=A×B+C is then entirely stored in registers MSW and LSW. This result on 64 bits has its 32 highest weight bits in register MSW and its 32 lowest weight bits in the intermediate output register LSW. In the second multiplication, the 16 highest weight bits of the second data B are sent to the multiplier circuit 34 via an additional data bus 36 which connects the target register Treg and an input of the multiplexer 31, and via the multiplexer 31.

The is done because the 16 highest weight bits of the second data B are stored in the 16 lowest weight bits of register Treg, so that they are directly accessible to the multiplier circuit 34. In contrast, if the 16 highest weight bits of the second data were accessed directly from the second register Breg, one or more clock cycles would be necessary to synchronize the different operations before the multiplier circuit 34 could effectively access the 16 highest weight bits of the second data B stored in the second register Breg. Nevertheless, in further embodiments the method of the present invention is implemented without using the register Treg, but the execution of the multiplication with accumulation operation is slower for the reasons explained above.

Registers Areg, Breg, Treg, MSW, and LSW are preferably registers that can store 32 bits. However, they can also have a larger capacity. The data that is successively written in the intermediate register MSW erases the previous data stored in that register. Further, the method of the present invention can also be implemented to carry out a simple multiplication operation in the sense of Galois arithmetic. In particular, a simple multiplication operation corresponds to the case of a multiplication with accumulation in which the third data C is zero.

Figure 3:
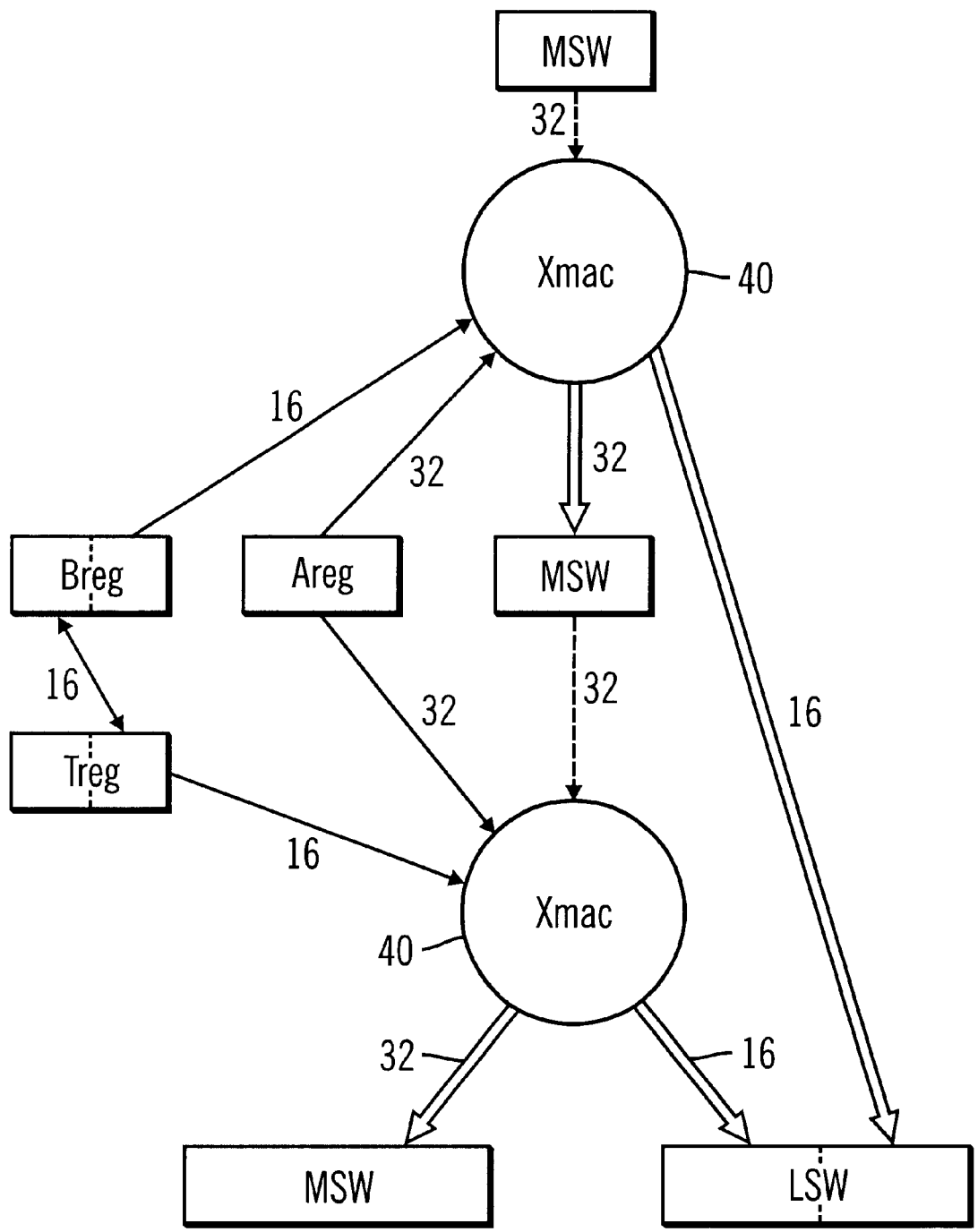
FIG. 3 shows a sequence of two multiplication operations with accumulation in accordance with an embodiment of the present invention.

FIG. 3 illustrates the sequence of two multiplication with accumulation operation implemented in accordance with an embodiment of the method of the present invention, which arrives at the same result as a conventional multiplication with accumulation operation. In FIG. 3, the circles 40 can correspond to electronic components for performing multiplication with accumulation operation in which one of the two factors of the multiplication is coded on 16 bits, the other multiplication factor is coded on 32 bits, and the added data is coded on 32 bits. As in FIG. 2, the data A, B, and C are initially stored in registers Areg, Breg, and MSW.

Additionally, in FIG. 3, arrows in solid lines from the different registers directed to the multiplication operations with accumulation indicate that data from these registers is to be multiplied within the multiplication with accumulation operation. The data from the registers from which the arrows in dotted lines leave is to be added within the multiplication with accumulation operation. The arrows in double lines from the operations of multiplication with accumulation are the results from these operations of multiplication with accumulation. Further, the bi-directional arrows indicate an exchange of data between two registers. The numbers associated with the different arrows correspond to the number of bits for the corresponding operation.

As shown, the 32 bits of the first data A are multiplied with the 16 lowest weight bits of the second data B, and the result of this multiplication is added to the 32 bits of the data C to produce a result, which is stored in the intermediate register MSW for the 32 highest weight bits and in the output register LSW for the 16 lowest weight bits. The second multiplication with accumulation operation uses the 32 bits of data A, multiplied by the 16 highest weight bits of data B, which were previously transferred into the target register Treg, and the 32 new bits of register MSW for the addition portion of the multiplication with accumulation operation.

The result of the second multiplication with accumulation is stored in the intermediate register MSW for the 32 highest weight bits, and in the 16 highest weight bits of the intermediate register LSW for the 16 lowest weight bits. The final result of the operation Xmac (A, B, C) is the daisy-chaining of the contents of register MSW, the 16 highest weight bits of register LSW, and the 16 lowest weight bits of register LSW produced by the first multiplication with accumulation operation.

Accordingly, the circuit and method of the present invention allow a multiplication with accumulation operation in a Galois Field to be performed between numbers coded on 2 n bits by using a linked sequence of identical operations. In particular, two multiplications between numbers coded on 2 n bits and a number coded on n bits are performed. This makes it possible to use significantly smaller multiplier circuits.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for performing multiplication with accumulation in a Galois Field on a first data, a second data, and a third data, each of the data being coded on 2 n bits, said method comprising the steps of:

performing a first multiplication, in the sense of the arithmetic of a Galois Field, on the first data and the n lowest weight bits of the second data to produce a first intermediate result coded on 3 n bits;

performing a first addition, in the sense of the arithmetic of a Galois Field, on the third data and the first intermediate result to produce a second intermediate result on 3 n bits;

performing a second multiplication, in the sense of the arithmetic of a Galois Field, on the first data and the n highest weight bits of the second data to produce a third intermediate result on 3 n bits; and performing a second addition, in the sense of the arithmetic of a Galois Field, on the 2 n highest weight bits of the second intermediate result and the third intermediate result to produce a fourth intermediate result coded on 3 n bits.

2. The method as defined in claim 1, further comprising the steps of:

storing the 2 n highest weight bits of the second intermediate result in an intermediate register, and the n lowest weight bits of the second intermediate result in an output register; and shifting the n lowest weight bits stored in the output register to the lowest weight bits of the output register.

3. The method as defined in claim 2, further comprising the step of storing the 2 n highest weight bits of the fourth intermediate result in the intermediate register and the n lowest weight bits in the output register.

4. The method as defined in claim 3, further comprising the step of storing the first data in a first input register, the second data in a second input register, the third data in the intermediate register.

5. The method as defined in claim 1, wherein the highest weight bits of the second data are transferred to a target register so as to for the second multiplication.

6. The method as defined in claim 1, wherein the first data, the second data, and the third data are coded on 32 bits.

7. The method as defined in claim 1, wherein the third data is zero.

8. A machine-readable medium encoded with a program for performing multiplication with accumulation in a Galois Field on a first data, a second data, and a third data, each of the data being coded on 2 n bits, said program containing instructions for performing the steps of:

performing a first multiplication, in the sense of the arithmetic of a Galois Field, on the first data and the n lowest weight bits of the second data to produce a first intermediate result coded on 3 n bits;

performing a first addition, in the sense of the arithmetic of a Galois Field, on the third data and the first intermediate result to produce a second intermediate result on 3 n bits;

performing a second multiplication, in the sense of the arithmetic of a Galois Field, on the first data and the n highest weight bits of the second data to produce a third intermediate result on 3 n bits; and performing a second addition, in the sense of the arithmetic of a Galois Field, on the 2 n highest weight bits of the second intermediate result and the third intermediate result to produce a fourth intermediate result coded on 3 n bits.

9. The machine-readable medium as defined in claim 8, wherein said program further contains instructions for performing the steps of:

storing the 2 n highest weight bits of the second intermediate result in an intermediate register, and the n lowest weight bits of the second intermediate result in an output register; and shifting the n lowest weight bits stored in the output register to the lowest weight bits of the output register.

10. The machine-readable medium as defined in claim 9, wherein said program further contains instructions for performing the step of storing the 2 n highest weight bits of the fourth intermediate result in the intermediate register and the n lowest weight bits in the output register.

11. The machine-readable medium as defined in claim 10, wherein said program further contains instructions for performing the step of storing the first data in a first input register, the second data in a second input register, the third data in the intermediate register.

12. The machine-readable medium as defined in claim 8, wherein the highest weight bits of the second data are transferred to a target register so as to for the second multiplication.

13. The machine-readable medium as defined in claim 8, wherein the first data, the second data, and the third data are coded on 32 bits.

14. The machine-readable medium as defined in claim 8, wherein the third data is zero.

* * * * *